US012703646B2

(12) United States Patent
Jang et al.

(10) Patent No.: US 12,703,646 B2
(45) Date of Patent: Aug. 11, 2026

(54) NICKEL-BASED LITHIUM METAL COMPOSITE OXIDE, METHOD OF PREPARING THE SAME, AND LITHIUM SECONDARY BATTERY INCLUDING POSITIVE ELECTRODE INCLUDING THE SAME

(71) Applicant: Samsung SDI Co., Ltd., Yongin-si (KR)

(72) Inventors: Jungsue Jang, Yongin-si (KR); Jayhyok Song, Yongin-si (KR); Dongwook Shin, Yongin-si (KR); Jaeha Shim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 302 days.

(21) Appl. No.: 17/514,431

(22) Filed: Oct. 29, 2021

(65) Prior Publication Data

US 2022/0140317 A1 May 5, 2022

(30) Foreign Application Priority Data

Oct. 30, 2020 (KR) ........................ 10-2020-0143865

(51) Int. Cl.
*H01M 4/36* (2006.01)
*C01G 53/42* (2025.01)
(Continued)

(52) U.S. Cl.
CPC ............ *H01M 4/364* (2013.01); *C01G 53/42* (2013.01); *H01M 4/505* (2013.01); *H01M 4/525* (2013.01);
(Continued)

(58) Field of Classification Search
CPC ...... H01M 4/364; H01M 4/505; H01M 4/525; H01M 10/525; H01M 2004/021;
(Continued)

(56) References Cited

U.S. PATENT DOCUMENTS 8,795,896 B2 8/2014 Kawasato et al.
9,564,628 B2 2/2017 Kim et al.
(Continued)

FOREIGN PATENT DOCUMENTS

EP 3712990 9/2020
JP 2020072092 5/2020
(Continued)

OTHER PUBLICATIONS

Extended European Search Report dated Mar. 22, 2022, issued in European Patent Application No. 21205797.0.
(Continued)

*Primary Examiner* — Ula C Ruddock
*Assistant Examiner* — Olivia Mason Ruggiero
(74) *Attorney, Agent, or Firm* — Womble Bond Dickinson (US) LLP

(57) ABSTRACT

A nickel-based lithium metal composite oxide including secondary particles including aggregates of primary particles. The secondary particles include i) large secondary particles having a particle size of at least about 14 μm and including aluminum and ii) small secondary particles having a particle size of no more than about 5 μm and including manganese, and a manganese content by mole percent of each of the large secondary particles is smaller than a manganese content by mole percent of each of the small secondary particles and manganese is included on a surface of each of the large secondary particles and aluminum is included on a surface of each of the small secondary particles.

16 Claims, 11 Drawing Sheets

(51) Int. Cl.
*H01M 4/02* (2006.01)
*H01M 4/505* (2010.01)
*H01M 4/525* (2010.01)
*H01M 10/0525* (2010.01)

(52) U.S. Cl.
CPC ...... *C01P 2002/54* (2013.01); *C01P 2002/90* (2013.01); *C01P 2004/50* (2013.01); *C01P 2004/61* (2013.01); *C01P 2006/40* (2013.01); *H01M 2004/021* (2013.01); *H01M 2004/028* (2013.01); *H01M 10/0525* (2013.01); *H01M 2220/20* (2013.01)

(58) Field of Classification Search
CPC .............. H01M 2004/028; C01G 53/42; C01P 2002/54; C01P 2002/90; C01P 2004/50; C01P 2004/61; C01P 2006/40
See application file for complete search history.

(56) References Cited

U.S. PATENT DOCUMENTS 11,417,875 B2 8/2022 Hong et al.
2007/0122705 A1* 5/2007 Paulsen .............. C01G 45/1228 429/223
2008/0118829 A1* 5/2008 Nanno .................. H01M 4/525 252/182.1
2009/0148772 A1* 6/2009 Kawasato ............. C01G 51/42 264/681
2009/0258296 A1* 10/2009 Kawasato ............. H01M 4/485 429/223
2010/0310934 A1 12/2010 Yang et al.
2014/0038052 A1* 2/2014 Song .................. H01M 4/5815 429/223
2019/0148717 A1* 5/2019 Choi .................. H01M 10/052 429/209
2019/0341598 A1* 11/2019 Nam ..................... H01M 4/134
2020/0266438 A1 8/2020 Han et al.
2020/0335783 A1 10/2020 Lee et al.
2020/0388830 A1 12/2020 Lee et al.
2021/0408528 A1 12/2021 Chae et al.
2022/0037662 A1 2/2022 Yun et al.
2022/0059832 A1 2/2022 Han et al.

FOREIGN PATENT DOCUMENTS

KR 20100131252 A 12/2010
KR 20130125236 A 11/2013
KR 10-2014-0098424 8/2014
KR 10-2018-0063859 6/2018
KR 20190058367 5/2019
KR 101991254 B1 6/2019
KR 20190078498 A 7/2019
KR 10-2020-0066246 6/2020
KR 10-2020-0085693 7/2020
KR 10-2022-0001953 1/2022
WO 2008-155989 12/2008
WO 2020-122497 6/2020
WO WO-2020122497 A1 * 6/2020 .......... H01M 10/052

OTHER PUBLICATIONS

Office Action dated Sep. 29, 2022 from the Korean Patent Office for Korean Patent Application No. 10-2020-0143865.
Office Action dated Nov. 7, 2022 from the Japanese Patent Office for Japanese Patent Application No. 2021-177765.
Office Action dated Feb. 9, 2022 from the Korean Patent Office for Korean Patent Application No. 10-2020-0143865.
Office Action dated Jan. 12, 2024, issued to CN Patent Application No. 202111270163.8.
European Office action for Patent Application No. 21205797.0, dated Sep. 4, 2025, 5 pages.

* cited by examiner

NICKEL-BASED LITHIUM METAL COMPOSITE OXIDE, METHOD OF PREPARING THE SAME, AND LITHIUM SECONDARY BATTERY INCLUDING POSITIVE ELECTRODE INCLUDING THE SAME

CROSS-REFERENCE TO RELATED APPLICATION

This application claims priority from and the benefit of Korean Patent Application No. 10-2020-0143865, filed on Oct. 30, 2020, which is hereby incorporated by reference for all purposes as if full set forth herein.

BACKGROUND

Field

Embodiments of the invention relate generally to nickel (Ni)-based lithium metal composite oxides, and more particularly to methods of preparing the same, positive electrodes including the same, and lithium secondary batteries including the positive electrodes.

Discussion of the Background

With the development of portable electronic devices, communication devices, and the like, there is a need to develop lithium secondary batteries having high energy density. When a lithium metal composite oxide is used as a positive active material in a lithium secondary battery, large secondary particles may be mixed with small secondary particles to prevent the positive active material from disintegrating even when pressed, resulting in enhancement of performance, and high-density electrode plates may be prepared, and thus lithium secondary batteries having high energy density may be prepared.

In a process of preparing the lithium metal composite oxide, heat treatment may be performed. Particularly, a Ni-based lithium metal composite oxide using nickel as one of metal elements may have improved performance via appropriate heat treatment.

However, because the large secondary particles have different properties from those of the small secondary particles, the small secondary particles or the large secondary particles may be excessively or insufficiently calcined when simultaneously heat-treated, resulting in deterioration of performance. Therefore, the large secondary particles and the small secondary particles are separately heat-treated and then a mixture of the heat-treated particles is further heat-treated. Due to several heat treatment processes, a process of preparing the positive active material becomes complicated and manufacturing costs increase, and thus improvements in this regard are needed.

The above information disclosed in this Background section is only for understanding of the background of the inventive concepts, and, therefore, it may contain information that does not constitute prior art.

SUMMARY

Nickel-based lithium metal composite oxides made and secondary batteries having positive electrodes constructed and methods thereof according to illustrative implementations of the invention are capable of providing lithium secondary batteries having improved lifespan characteristics by using the illustrative positive electrodes.

Additional features of the inventive concepts will be set forth in the description which follows, and in part will be apparent from the description, or may be learned by practice of the inventive concepts.

According to one aspect of the invention, a nickel-based lithium metal composite oxide including secondary particles including aggregates of primary particles, wherein the secondary particles include i) large secondary particles having a particle size of at least about 14 μm and including aluminum and ii) small secondary particles having a particle size of no more than about 5 μm and including manganese, and a manganese content by mole percent of each of the large secondary particles based on total moles of metal excluding lithium of the large secondary particles is smaller than a manganese content by mole percent of each of the small secondary particles based on total moles of metal excluding lithium of the small secondary particles and manganese is included on a surface of each of the large secondary particles and aluminum is included on a surface of each of the small secondary particles.

A method of preparing the nickel-based lithium metal composite oxide as described above includes the steps of: preparing a precursor mixture by mixing a large precursor having a size of at least about 14 μm and including aluminum, a small precursor having a size of no more than about 5 μm and including manganese, and a lithium precursor; and heat-treating the precursor mixture.

A positive electrode includes the nickel-based lithium metal composite oxide as described above, and a lithium secondary battery includes the positive electrode, a negative electrode, and an electrolyte therebetween.

According to another aspect of the invention, a metal oxide composite including nickel, lithium, and secondary particles including aggregates of primary particles, wherein the secondary particles include i) large secondary particles having a particle size of at least about 14 μm and including aluminum and ii) small secondary particles having a particle size of no more than about 5 μm and including manganese, and a manganese content by mole percent of at least some of the large secondary particles is smaller than a manganese content by mole percent of at least some of the small secondary particles and manganese is included on a surface of at least some of the large secondary particles and aluminum is included on a surface of at least some of the small secondary particles.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1A:
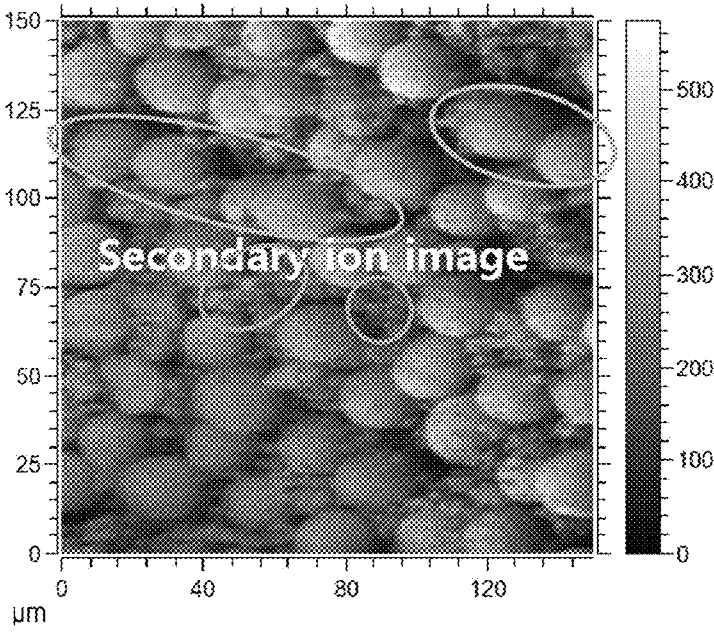
FIGS. 1A to 1E are photographic depictions illustrating results of time-of-flight secondary ion mass spectrometry (TOF-SIMS) analysis of a Ni-based lithium metal composite oxide of Example 1.
Figure 1B:
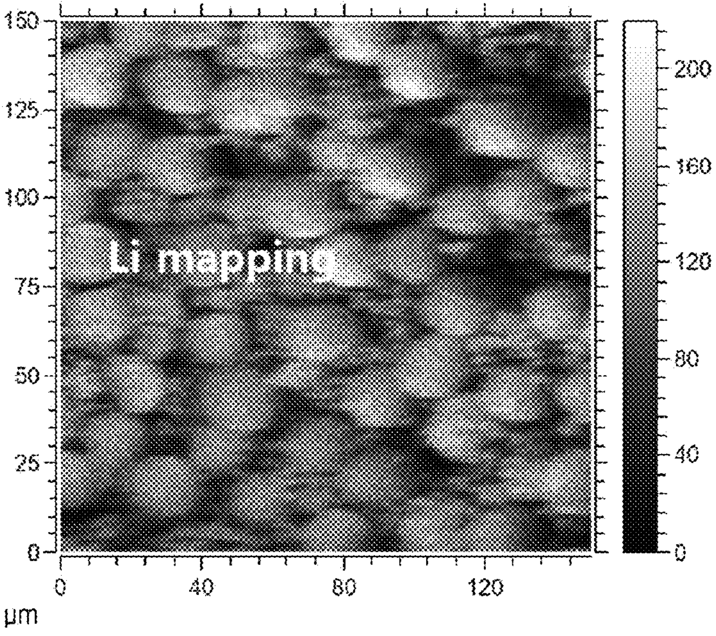
Figure 1C:
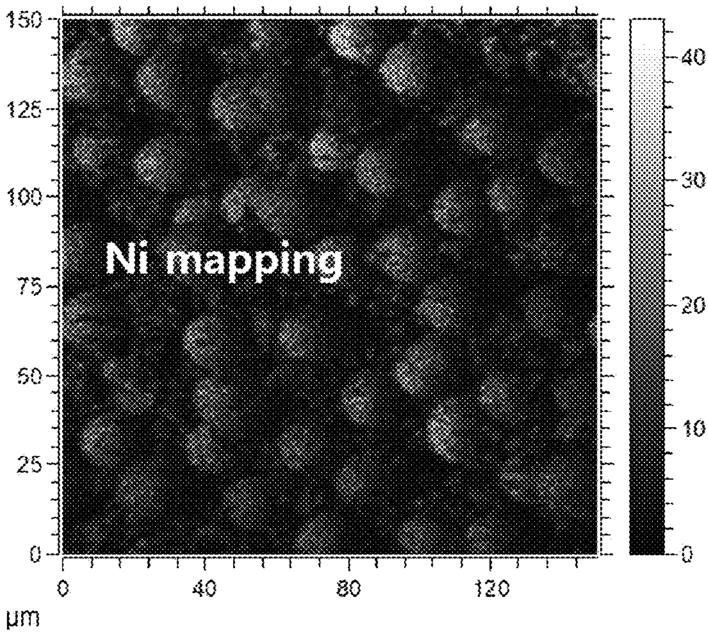

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional, cut-away and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a nickel (Ni)-based lithium metal composite oxide, a preparing method thereof, and a positive electrode and a lithium secondary battery including the same according to embodiments will be described in detail herein. Provided is a Ni-based lithium metal composite oxide including secondary particles including aggregates of primary particles, wherein the secondary particles include i) large secondary particles having a particle size of about 14 μm or more and including aluminum (Al) and ii) small secondary particles having a particle size of about 5 μm or less and including manganese (Mn), and a Mn content (by mole percent) of each large secondary particle based on total moles of metal excluding lithium of the large secondary particles is smaller than that of each small secondary particle based on total moles of metal excluding lithium of the small secondary particles and Mn is included on a surface of each large secondary particle and Al is included on a surface of each small secondary particle.

In general, Ni-based lithium metal composite oxides for lithium secondary batteries having excellent capacity characteristics may be prepared by heat-treating a mixture of a large Ni-based lithium metal hydroxide, a small Ni-based lithium metal hydroxide, and a lithium precursor. Because a precursor of the large Ni-based lithium metal hydroxide has properties different from those of a precursor of the small Ni-based lithium metal hydroxide, a desired Ni-based lithium metal composite oxide may be prepared by separately performing first heat treatment on the precursors and then second heat treatment on a mixture of the precursors and the lithium precursor. As described above, three heat-treating processes required to obtain the Ni-based lithium metal composite oxide may result in increased manufacturing costs and a complicated manufacturing process, and thus improvement on these characteristics is required.

To solve the above-described problems, methods of simultaneously heat-treating the large Ni-based lithium metal hydroxide and the small Ni-based lithium metal hydroxide have been attempted. However, when a heat treatment temperature is raised in accordance with the large Ni-based lithium metal hydroxide in the simultaneous heat treatment, it is difficult to form a small Ni-based lithium metal composite oxide. When the heat treatment temperature is lowered in accordance with the small Ni-based lithium metal hydroxide in the simultaneous heat treatment, characteristics of a lithium secondary battery prepared using the same may deteriorate due to insufficient heat treatment for a large Ni-based lithium metal composite oxide.

To prepare a high-capacity positive active material, compounds having a high Ni content may be used as the large Ni-based lithium metal hydroxide and the small Ni-based lithium metal hydroxide. When Ni-based lithium metal hydroxides having a high Ni content and different particle sizes are simultaneously heat-treated, primary particles of a Ni-based lithium metal composite oxide obtained therefrom have different sizes. Accordingly, the large Ni-based lithium metal composite oxide has a particle strength different from that of the small Ni-based lithium metal composite oxide, resulting in deaggregation of the secondary particles during a process of rolling an electrode including the same. As a result, the active material breaks while rolling the electrode.

Applicant has conducted extensive research to solve the above-mentioned problems and found that a phenomenon, although not wanting to be bound by theory, in which an active material breaks or disintegrates while an electrode is rolled, may be effectively inhibited by increasing particle strength of the Ni-based lithium metal composite oxide by controlling particles sizes of primary particles at the same optimal temperature while simultaneously heat-treating the large and small precursors having different compositions. Also, the Ni-based lithium metal composite oxide has excellent structural stability and excellent capacity characteristics.

The large Ni-based lithium metal composite oxide, as the large secondary particles, may not include Mn, or the Mn content may be from about 0.01 mol % to about 0.5 mol % in the and based on the total moles of metal excluding lithium of the large Ni-based lithium metal composite oxide. In addition, the small Ni-based lithium metal composite oxide, as the small secondary particles, may have the Mn content of about 0.5 mol % to about 5 mol % based on the total moles of metal excluding lithium of the small Ni-based lithium metal composite oxide. The lithium metal composite oxide having the above-described composition may have high capacity and side reaction between Mn of the small secondary particle and remaining lithium may be inhibited.

The large Ni-based lithium metal composite oxide includes Al. The Al content may be from about 0.5 mol % to about 5 mol %, for example, from about 1 mol % to about 3 mol % based on the total moles of metal excluding lithium of the large Ni-based lithium metal composite oxide. In the small Ni-based lithium metal composite oxide, the Mn content may be from about 0.5 mol % to about 5 mol %, for example, from about 1 mol % to about 3 mol % based on the total moles of metal excluding lithium of the small Ni-based lithium metal composite oxide. When the Al content and the Mn content are within the ranges described above, a Ni-based lithium metal composite oxide having excellent structural stability and high energy density may be obtained. The Al contents and the Mn contents of the large secondary particles and the small secondary particles included in the Ni-based lithium metal composite oxide, and a difference therebetween may be maintained substantially the same as the Al contents and the Mn contents of the large precursor and the small precursor used to prepare the Ni-based lithium metal composite oxide, and a difference therebetween.

The large precursor and the small precursor may be, for example, an Ni-based metal composite hydroxide or a Ni-based metal composite oxide. The large secondary particles are secondary particles having an average particle diameter of about 14 μm or more, as aggregates of primary particles having an average particle diameter of about 1 μm or less, for example, about 0.1 μm to about 1 μm, and the small secondary particles are secondary particles having an average particle diameter of about 5 μm or less, as aggregates of primary particles having an average particle diameter of about 1 μm or less, for example, about 0.1 μm to about 1 μm. As used herein, the term "size" refers to a particle diameter when a particle of the Ni-based lithium metal composite oxide or the precursor is spherical. In addition, when the particle is not spherical, the size refers to a length of a major axis. The particle diameter may be an average particle diameter, and the long-axis length may be an average long-axis length. The average particle diameter and average major axis length refer to the average value of the measured particle diameters and the average value of the measured major axis lengths.

The average particle diameter may be measured by particle size distribution (PSD) or scanning electron microscopy (SEM). The length of the major axis may be measured by SEM, or the like. For example, the average particle diameter is the average diameter observed with the scanning electron microscope (SEM), and can be calculated as an average value of the particle diameters of about 10-30 particles using a SEM image. For example, the particle diameter may be a median particle size or a D50 particle size. The D50 particle size indicates that 50% of the particles in a volume distribution of particle sizes have a larger particle size and 50% of the particles in the volume distribution of particle sizes have a smaller particle size. When the particle is spherical, the term "average particle diameter" of the particles may be, a median diameter (D50). In the present specification, "D50" refers to a particle diameter corresponding to a volume of 50% with respect to a cumulative particle distribution ordered from smallest size to largest size. The distribution may be accumulated in the order of the smallest particle size to the largest particle size. In the curve, when the total number of particles is 100%, it means the value of the particle diameter corresponding to 50% from the smallest particle.

The Mn contents of the large precursor and the small precursor are the same as the Mn contents of the large Ni-based lithium metal composite oxide, as the large secondary particles, and the small Ni-based lithium metal composite oxide, as the small secondary particles, as described above. When the Mn contents of the large precursor and the small precursor are within the above ranges, a Ni-based lithium metal composite oxide having excellent structural stability and high energy density may be obtained by simultaneously heat-treating the large precursor and the small precursor.

The Ni content of the large Ni-based lithium metal composite oxide is identical to that of the small Ni-based lithium metal composite oxide as for example about 60 mol % or more, about 75 mol % or more, about 80 mol % or more, from about 80 mol % to about 99 mol %, from about 85 mol % to about 95 mol %, or from about 88 mol % to about 90 mol % based on the total moles of metal excluding lithium of the Ni-based lithium metal composite oxide. The Ni contents of the large secondary particles and the small secondary particles included in the Ni-based lithium metal composite oxide, and a difference therebetween may be maintained substantially the same as the Ni contents of the large precursor and the small precursor, and a difference therebetween. The large precursor may have a particle size of about 12 μm to about 20 μm, for example, about 14 μm to about 18 μm. In addition, the small precursor may have a particle size of about 2 μm to about 5 μm, for example, about 3 μm to about 4 μm.

An amount of the large precursor may be from about 30 parts by weight to about 90 parts by weight, from about 50 parts by weight to about 90 parts by weight, from about 60 parts by weight to about 90 parts by weight, from about 70 parts by weight to about 90 parts by weight, or from about 70 parts by weight to about 80 parts by weight based on 100 parts by weight of a total amount of the large precursor and the small precursor. In addition, in the Ni-based lithium metal composite oxide of some embodiments, an amount of the large secondary particles may be from about 30 parts by weight to about 90 parts by weight, from about 50 parts by weight to about 90 parts by weight, from about 60 parts by weight to about 90 parts by weight, from about 70 parts by weight to about 90 parts by weight, or from about 70 parts by weight to about 80 parts by weight based on 100 parts by weight of a total amount of the large secondary particles and the small secondary particles. When a mixing ratio of the large secondary particles and the small secondary particles is within the above range, a Ni-based lithium metal composite oxide having excellent structural stability and high energy density may be obtained by simultaneously heat-treating the large precursor and the small precursor.

The Ni-based lithium metal composite oxide according to an embodiment may be prepared by preparing a precursor mixture by mixing a large precursor having a size of about 14 μm or more and including Al, a small precursor having a size of about 5 μm or less and including Mn, and a lithium precursor, and heat-treating the precursor mixture.

The large precursor may not include Mn or the Mn content of the large precursor may be about 0.5 mol % or less, for example, from about 0 mol % or about 0.01 mol % to about 0.5 mol % based on the total moles of metal of the large precursor. According to an embodiment, the large precursor does not include Mn. In the small precursor, the Mn content is from about 0.5 mol % to about 5 mol % or about 1 mol % to about 3 mol % based on the total moles of metal of the small precursor. In the large precursor, the Al content is from about 0.5 mol % to about 5 mol % or about 1 mol % to about 3 mol % based on the total moles of metal of the large precursor. For example, the heat-treating is performed at a temperature of about 600° C. to about 900° C., about 650° C. to about 850° C., or about 680° C. to about 760° C.

The large secondary particles including Al may consist of a compound represented by Formula 1 below.

$$Li_a(Ni_{1-x-y-z}Co_xAl_yM_z)O_{2\pm\alpha1} \quad \text{Formula 1}$$

In Formula 1, M is an element selected from boron (B), magnesium (Mg), calcium (Ca), strontium (Sr), barium (Ba), titanium (Ti), vanadium (V), chromium (Cr), iron (Fe), copper (Cu), and zirconium (Zr), $0.95 \leq a \leq 1.1$, $0.6 \leq (1-x-y-z) < 1$, $0 < x < 0.4$, $0 < y < 0.4$, $0 \leq z < 0.4$, and $0 \leq \alpha1 \leq 0.1$.

In Formula 1, $0.8 \leq (1-x-y-z) < 1$.

In Formula 1, y is, for example, from 0.001 to 0.3, from 0.003 to 0.2, from 0.005 to 0.05, or from 0.01 to 0.03.

The small secondary particles including Mn may consist of a compound represented by Formula 2 below.

$$Li_a(Ni_{1-x-y-z}Co_xMn_yM_z)O_{2\pm\alpha1} \quad \text{Formula 2}$$

In Formula 2, M is an element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $0.95 \leq a \leq 1.1$, $0.6 \leq (1-x-y-z) < 1$, $0 < x < 0.4$, $0 < y < 0.4$, $0 \leq z < 0.4$, and $0 \leq \alpha1 \leq 0.1$.

In Formula 2, y is, for example, from 0.001 to 0.3, from 0.003 to 0.2, from 0.005 to 0.05, or from 0.01 to 0.03.

The large secondary particles may consist of a compound represented by Formula 3 below.

$$Li_a(Ni_{1-x-y}Co_xAl_y)O_{2\pm\alpha1} \quad \text{Formula 3}$$

In Formula 3, $0.95 \leq a \leq 1.1$, $0.6 \leq (1-x-y) < 1$, $0 < x < 0.4$, $0 < y < 0.4$, and $0 \leq \alpha1 \leq 0.1$.

In Formula 3, 1-x-y is, for example, from 0.80 to 0.98, x is from 0.01 to 0.1, and y is, for example, from 0.001 to 0.3, from 0.005 to 0.05, or from 0.01 to 0.03.

The small secondary particles may consist of a compound represented by Formula 4 below.

$$Li_a(Ni_{1-x-y}Co_xMn_y)O_{2\pm\alpha1} \quad \text{Formula 4}$$

In Formula 4, $0.95 \leq a \leq 1.1$, $0.6 \leq (1-x-y) < 1$, $0 < x < 0.4$, $0 < y < 0.4$, and $0 \leq \alpha1 \leq 0.1$.

In Formula 4, 1-x-y is, for example, from 0.80 to 0.98, x is from 0.01 to 0.1, and y is, for example, from 0.01 to 0.1, from 0.005 to 0.05, or from 0.01 to 0.03.

Hereinafter, a method of preparing the Ni-based lithium metal composite oxide according to an embodiment will be described in more detail. A precursor mixture is prepared by mixing the large precursor, the small precursor, and the lithium precursor and then heat-treating to obtain the Ni-based lithium metal composite oxide.

The large precursor may have a particle size of about 14 μm or more, for example, from about 12 μm to about 18 μm, and the small precursor as the small secondary particles may have a particle size of about 5 μm or less, for example, from about 2 μm to about 5 μm.

The large precursor may be a compound represented by Formula 5 below.

$$(Ni_{1-x-y-z}Co_xAl_yM_z)(OH)_2 \quad \text{Formula 5}$$

In Formula 5, M is an element selected from boron (B), magnesium (Mg), calcium (Ca), strontium (Sr), barium (Ba), titanium (Ti), vanadium (V), chromium (Cr), iron (Fe), copper (Cu), and zirconium (Zr), $0.6 \leq (1-x-y-z) < 1$, $0 < x < 0.4$, $0 < y < 0.4$, and $0 \leq z < 0.4$.

In Formula 5, $0.8 \leq (1-x-y-z) < 1$.

The variable y is, for example, from 0.001 to 0.3, from 0.005 to 0.1, from 0.005 to 0.05, or from 0.01 to 0.03.

The small precursor may be a compound represented by Formula 6 below.

$$(Ni_{1-x-y-z}Co_xMn_yM_z)(OH)_2 \quad \text{Formula 6}$$

In Formula 6, M is an element selected from boron (B), magnesium (Mg), calcium (Ca), strontium (Sr), barium (Ba), titanium (Ti), vanadium (V), chromium (Cr), iron (Fe), copper (Cu), and zirconium (Zr), $0.6 \leq (1-x-y-z) < 1$, $0 < x < 0.4$, $0 < y < 0.4$, and $0 \leq z < 0.4$.

The variable y is, for example, from 0.001 to 0.3, from 0.005 to 0.1, from 0.005 to 0.05, or from 0.01 to 0.03.

In Formulae 5 and 6, the Ni content is from about 60 mol % to about 98 mol %, for example, from about 80 mol % to about 96 mol %. The large precursor may be, for example, $Ni_{0.92}Co_{0.05}Al_{0.03}(OH)_2$, $Ni_{0.94}Co_{0.03}Al_{0.03}(OH)_2$, $Ni_{0.88}Co_{0.06}Al_{0.06}(OH)_2$, $Ni_{0.96}Co_{0.02}Al_{0.02}(OH)_2$, $Ni_{0.91}Co_{0.07}Al_{0.02}(OH)_2$, $Ni_{0.90}Co_{0.07}Al_{0.03}(OH)_2$, $Ni_{0.93}Co_{0.04}Al_{0.03}(OH)_2$, $Ni_{0.8}Co_{0.15}Al_{0.05}(OH)_2$, $Ni_{0.9}Co_{0.09}Al_{0.01}(OH)_2$, or $Ni_{0.75}Co_{0.20}Al_{0.05}(OH)_2$. In addition, the small precursor may be, for example, $Ni_{0.92}Co_{0.05}Mn_{0.03}(OH)_2$, $Ni_{0.94}Co_{0.03}Mn_{0.03}(OH)_2$, $Ni_{0.88}Co_{0.06}Mn_{0.06}(OH)_2$, $Ni_{0.96}Co_{0.02}Mn_{0.02}(OH)_2$, $Ni_{0.91}Co_{0.07}Mn_{0.02}(OH)_2$, $Ni_{0.90}Co_{0.07}Mn_{0.03}(OH)_2$, $Ni_{0.93}Co_{0.04}Mn_{0.03}(OH)_2$, $Ni_{0.8}Co_{0.15}Mn_{0.05}O_2(OH)_2$, $Ni_{0.75}Co_{0.20}Mn_{0.05}(OH)_2$, $Ni_{0.9}Co_{0.09}Mn_{0.01}(OH)_2$, or any combination thereof.

As described herein, the compositions of the large and small precursors are adjusted to correspond to the composition of the large and small Ni-based metal composite oxides. The lithium precursor may be, for example, an anhydrous lithium hydroxide, a lithium hydroxide ($LiOH \cdot nH_2O$) (where n is 1 to 5), a lithium fluoride, a lithium carbonate or any mixture thereof.

The amount of the lithium precursor is adjusted such that a molar ratio of lithium of the lithium precursor to the total amount of transition metals of the large and small precursors is from about 0.95 to about 1.1, for example, from about 0.99 to about 1.06. The transition metals of the large and small precursors are Ni, Co, Mn, and M in Formula 2. When the amount of the lithium precursor is within the above range, an active material having excellent electrochemical properties may be obtained without problems of cation mixing, decrease in crystallinity, and difficulty in gain growth due to lithium deficiency.

The amounts of the lithium precursor and the large and small precursors are stoichiometrically adjusted to prepare the Ni-based lithium metal composite oxide of Formula 1. The mixing may be performed by drying mixing or using a mixer. The heat-treating is performed in an oxidizing gas atmosphere. The oxidizing gas atmosphere is prepared using an oxidizing gas such as oxygen or air, and the oxidizing gas may include, for example, about 10 to about 20 vol % of oxygen or air and about 80 to about 90 vol % of an inert gas.

The heat treatment may be performed at a temperature where reactions of the lithium precursor, the large precursor, and the small precursor proceed and less than a densification temperature. In this regard, the densification temperature refers to a temperature at which crystallization is sufficiently performed to realize a charge capacity obtained by an active material. The heat treatment may be performed at a temperature of about 600° C. to about 900° C., about 650° C. to about 850° C., for example, about 680° C. to about 760° C. When the heat treatment is performed within the above-described temperature ranges, a positive active material having excellent performance may be obtained without problems of rapid deterioration of electrochemical properties such as capacity and efficiency due to excessive growth of grains, deterioration of crystallinity due to insufficient growth of grains, and an increased amount of residual lithium on the surface of positive active material due to a decreased amount of lithium introduced into the structure or scattering. The heat treatment is performed, for example, for about 3 hours to about 10 hours, although the heat treatment time varies according to low temperature heat treatment temperature. A mixing ration of the large precursor to the small precursor is from about 9:1 to about 3:7 or from about 9:1 to about 7:3.

The large precursor as the large secondary particles and the small precursor as the small secondary particles may be prepared using any method known in the art. For example, the large precursor and the small precursor may be prepared by modifying only a drying process of the precursors.

The large precursor may be dried at a temperature of about 180° C. to about 200° C., for example, about 190° C. to about 200° C., and the small precursor may be dried at a temperature of about 205° C. to about 220° C. or about 210° C. to about 215° C. The lithium precursor may be a lithium carbonate ($Li_2CO_3$), a lithium hydroxide, a lithium fluoride, or the like, but is not limited thereto, and any lithium precursor commonly used in the art may also be used.

A complexing agent and a pH regulator are added to and mixed with the precursor mixture including the large precursor, the small precursor, and the lithium precursor. Ammonia water, as an ammonium ion source, is used as the complexing agent, and a sodium hydroxide solution is used as the pH regulator. The pH of the resultant is adjusted in a range of about 11 to about 13 by controlling the amount of the pH regulator.

A precipitate obtained from the resultant is washed with pure water and subjected to second heat treatment to prepare the Ni-based lithium metal composite oxide. By analyzing the Ni-based lithium metal composite oxide obtained according to the above-described preparation method by time-of-flight secondary ion mass spectrometry (TOF-SIMS), the shape, structure, and composition of the Ni-based lithium metal composite oxide may be confirmed. Based on the analysis, presence of Mn on the surfaces of the large secondary particles and presence of Al on the surfaces of the small secondary particles may be indirectly confirmed.

A TOF-SIMS device is a device manufactured by mounting a TOF, which is a mass spectrometer, on an SIMS device. Specifically, the SIMS device is a device capable of obtaining chemical components and surface structures of an analyte by analyzing ions (cations or anions) emitted when primary ions collide with the surface of the analyte. The TOF mass spectrometer is a device having excellent mass resolution enabling simultaneous measurement of all ions having masses with high ion penetration rates. The TOF-SIMS device may directly obtain information on molecules by forming secondary ions of molecules that are analytically useful and has high sensitivity to elements as well as molecules and high spatial resolution due to finely focused ion beam.

A Mn content on a surface of each large secondary particle including Al is from about 0.01 mol % to about 0.2 mol % based on a total amount of metals excluding lithium of the large secondary particle, and an Al content on a surface of each small secondary particle including Mn is from about 0.01 mol % to about 0.2 mol % based on the total amount of metals excluding lithium of the small secondary particle. A lithium secondary battery having improved storage characteristics at high temperature may be prepared by using the Ni-based lithium metal composite oxide having the composition described above.

The large secondary particle of the Ni-based lithium metal composite oxide of some embodiments may be, for example, $LiNi_{0.9}Co_{0.09}Al_{0.01}O_2$, $LiNi_{0.90}Co_{0.07}Al_{0.03}$, $Li_{1.05}Ni_{0.9}Co_{0.09}Al_{0.01}O_2$, $Li_{1.05}Ni_{0.90}Co_{0.07}Al_{0.03}$, or the like, and the small secondary particle may be, for example, $LiNi_{0.9}Co_{0.09}Mn_{0.0102}$, $LiNi_{0.90}Co_{0.07}Mn_{0.0302}$, $Li_{1.05}Ni_{0.9}Co_{0.09}Mn_{0.01}O_2$, $Li_{1.05}Ni_{0.90}Co_{0.07}Mn_{0.03}O_2$, or the like.

A positive electrode according to an embodiment has a mixture density of about 4.0 g/cc or more, about 4.1 g/cc or more, from about 4.0 g/cc to about 4.2 g/cc, or from about 4.15 g/cc to about 4.2 g/cc. In addition, the positive electrode has a porosity of about 5% to about 40%.

Mixed density was measured by dividing the weight of the positive electrode components other than the current collector (i.e., active material, conductive material, binder, etc.) by the volume of the positive electrode.

In the present specification, the porosity of the positive electrode refers to a proportional volume occupied by the pores, relative to a total volume of the positive electrode.

The porosity of each positive electrode was calculated according to Equation 1:

$$P=\{A-(B/T)\}/A\times 100\%. \quad \text{Equation 1:}$$

In Equation 1, P denotes a porosity of a positive electrode, A denotes an actual volume of the positive electrode active material layer of a positive electrode, B denotes a weight of an active material in a positive electrode, and T denotes a true density of a positive electrode active material in a positive electrode, except for a positive electrode current collector. As to the true density, see the description above and "Principles and applications of lithium secondary batteries" by Park, Jungki, the entire content of which is incorporated herein by reference.

The Ni-based lithium metal composite oxide may have a specific surface area of about 0.2 $m^2/g$ to about 0.4 $m^2/g$ or about 0.25 $m^2/g$ to about 0.35 $m^2/g$. The specific surface area of the positive active material is measured using the Brunauer-Emmett-Teller (BET) method, specifically, calculated from nitrogen gas adsorption at a temperature of liquid nitrogen (77 K) using an adsorption device sold under the trade designation BELSORP-mino II manufactured by BEL Japan Inc. of Osaka, Japan. When the above-described Ni-based lithium metal composite oxide is used, the prepared lithium secondary battery may have improved low temperature characteristics and rate characteristics, reduced gas generation at high voltage, and excellent reliability and safety.

The large precursor and the small precursor according to an embodiment may be obtained according to any method commonly used in the art. The large precursor and the small precursor may be prepared by coprecipitating, for example, a Ni precursor and precursors of other transition metals. For example, the large precursor and the small precursor may be a hydroxide or an oxide including nickel, cobalt, and other metals, respectively.

The large precursor may be prepared by mixing a Ni precursor, a cobalt (Co) precursor, and an Al precursor in a first solvent, respectively.

The small precursor may be prepared by mixing a Ni precursor, a cobalt (Co) precursor, and a Mn precursor in a first solvent, respectively.

The Ni precursor, the Co precursor, the Al precursor, and the Mn precursor may be any material commonly used in the art. The Ni precursor may be a nickel sulfate, a nickel chloride, a nickel nitrate, or the like. In addition, a cobalt sulfate, a cobalt chloride, a cobalt nitrate, or the like is used as the Co precursor, and an aluminum sulfate, an aluminum chloride, an aluminum nitrate, or the like is used as the Al precursor and a manganese sulfate, a manganese chloride, a manganese nitrate, or the like is used as the Mn precursor. Amounts of the Ni precursor, the Co precursor, and the Al precursor are stoichiometrically adjusted to prepare the compound of Formula 1, and amounts of the Ni precursor, the Co precursor, and the Mn precursor are stoichiometrically adjusted to prepare the compound of Formula 2.

An M precursor may be further added when preparing the large precursor and the small precursor.

As the solvent in the coprecipitation, water, ethanol, propanol, butanol, or the like is used. A positive electrode according to another embodiment includes the above-described positive active material.

The positive electrode includes: a current collector; and a positive active material layer formed on the current collector and including the positive active material according to an embodiment. For example, the positive electrode may be prepared by molding a positive active material composition including the positive active material and a binder in a desired shape or coating the positive active material composition on a current collector, such as an Al foil.

Specifically, the positive active material composition is prepared by mixing the positive active material, a conductive material, a binder, and a solvent. The positive active material composition may be directly coated on a metal current collector to prepare a positive electrode plate. Alternatively, the positive electrode plate may be prepared by casting the positive active material composition on a separate support, and laminating a film separated from the support on a metal current collector. The positive electrode is not limited to the shapes described above and may also have any other shape.

The positive electrode may further include any other positive active material commonly used in the art. The known positive active material may include at least one selected from a lithium cobalt oxide, a lithium nickel cobalt manganese oxide, a lithium nickel cobalt aluminum oxide, a lithium iron phosphate, and a lithium manganese oxide, but is not limited thereto, and any positive active materials available in the art may further be used. Hereinafter, a method of preparing a lithium secondary battery including a positive electrode including the Ni-based lithium metal composite oxide according to an embodiment, a negative electrode, a lithium salt-containing non-aqueous electrolyte, and a separator will be described.

The positive electrode and the negative electrode may be prepared by forming a positive active material layer and a negative active material layer, respectively, by coating a positive active material layer-forming composition and a negative active material layer-forming composition on current collectors and drying the coatings. The positive active material layer-forming composition is prepared by mixing the positive active material, the conductive material, the binder, and the solvent. As the positive active material, the positive active material according to an embodiment is used.

The binder of the positive electrode serves to improve adhesion between particles of the positive active material and adhesion between the positive active material and a positive current collector. Examples of the binder may be a polyvinylidene fluoride (PVDF), a polyvinylidene fluoride/hexafluoropropylene copolymer (PVDF-co-HFP), a polyvinyl alcohol, a polyacrylonitrile, a carboxymethyl cellulose (CMC), a starch, a hydroxypropyl cellulose, a regenerated cellulose, a polyvinyl pyrrolidone, a tetrafluoro ethylene, a polyethylene, a polypropylene, an ethylene-propylene diene polymer (EPDM), a sulfonated-EPDM, a styrene butadiene rubber (SBR), a fluoride rubber, or various copolymers thereof, which may be used alone or in combination of at least two thereof.

The conductive material may be any material that does not cause any chemical change in a battery and has conductivity, without limitation. For example, the conductive material may be: a graphite such as a natural graphite and an artificial graphite; a carbonaceous material such as a carbon black, an acetylene black, a carbon black sold under the trade designation KETJENBLACK, a channel black, a furnace black, a lamp black, and a thermal black; a conductive fiber such as a carbon fiber and a metal fiber; a carbon fluoride; a metal powder such as an aluminum powder and a nickel powder; a conductive whisker such as a zinc oxide and a potassium titanate; a conductive metal oxide such as a titanium oxide; and conductive materials such as polyphenylene derivatives.

An amount of the conductive material may be from about 1 part by weight to about 10 parts by weight or about 1 part by weight to about 5 parts by weight based on 100 parts by weight of the positive active material. When the amount of the conductive material is within the range above, a finally obtained electrode has excellent conductivity.

Non-limiting examples of the solvent may include an N-methyl pyrrolidone. An amount of the solvent may be from about 20 parts by weight to about 200 parts by weight based on 100 parts by weight of the positive active material. When the amount of the solvent is within the range above, a process of forming the positive active material layer may efficiently be performed.

The positive current collector may be any material having a thickness of about 3 to about 500 μm and a high conductivity and not causing any chemical change in a battery without limitation. Examples of the positive current collector may include a stainless steel, an aluminum, nickel, titanium, a heat-treated carbon, or an aluminum or a stainless-steel surface-treated with carbon, nickel, titanium, silver, or the like. The current collector may have a surface on which irregularities are formed to enhance adhesive force of the positive active material and may be used in any of various forms including films, sheets, foils, nets, porous structures, foams, and non-woven fabrics. Separately, a negative active material, a binder, and a solvent are mixed to prepare a negative active material layer-forming composition.

As the negative active material, a material allowing intercalation and deintercalation of lithium ions is used. Non-limiting examples of the negative active material may include a carbonaceous material such as a graphite and carbon, a lithium metal and alloys thereof, and silicon oxide-based materials. According to some embodiments, a silicon oxide is used.

Non-limiting examples of the binder of the negative electrode may include a polyvinylidene fluoride/hexafluoropropylene copolymer (PVDF-co-HFP), a polyvinylidene fluoride, a polyacrylonitrile, a polymethylmethacrylate, a polyvinyl alcohol, a carboxymethyl cellulose (CMC), a starch, a hydroxypropyl cellulose, a regenerated cellulose, a polyvinylpyrrolidone, a tetrafluoroethylene, a polyethylene, a polypropylene, a polyacrylic acid, an ethylene-propylene diene monomer (EPDM), a sulfonated EPDM, a styrene butadiene rubber (SBR), a fluoride rubber, a polyacrylic acid, polymers thereof, hydrogen of polyacrylic acid is substituted with Li, Na, or Ca, or a combination thereof.

The negative active material layer may further include a conductive material. The conductive material may be any material which does not cause any chemical changes in the lithium battery and has high conductivity without limitation, and examples thereof include graphite such as a natural graphite or an artificial graphite; a carbon black such as acetylene black, a carbon black sold under the trade designation KETJENBLACK, a channel black, a furnace black, a lamp black, and a thermal black; a conductive fiber such as a carbon fiber or a metal fiber; a conductive tube such as a carbon nanotube; fluorocarbon powder; a metal powder such as an aluminum powder, and a nickel powder; a conductive whisker such as a zinc oxide and a potassium titanate; conductive metal oxides such as a titanium oxide; and a conductive materials such as polyphenyl derivatives. The conductive material may be a carbon black, preferably, a carbon black having an average particle diameter of dozens of nanometers.

The amount of the conductive material may be from about 0.01 parts by weight to about 10 parts by weight, from about 0.01 parts by weight to about 5 parts by weight, or from about 0.1 parts by weight to about 2 parts by weight based on 100 parts by weight of a total weight of the negative active material layer.

The negative active material layer-forming composition may further include a thickener. The thickener may include at least one of a carboxymethyl cellulose (CMC), a carboxyethyl cellulose, a starch, a regenerated cellulose, an ethyl cellulose, a hydroxymethyl cellulose, a hydroxyethyl cellulose, a hydroxypropyl cellulose, and a polyvinyl alcohol, for example, CMC.

The amount of the solvent may be from about 100 parts by weight to about 300 parts by weight based on 100 parts by weight of the total weight of the negative active material. When the amount of the solvent is within the above range, a process of forming the negative active material layer is easily performed.

The negative current collector is generally formed to have a thickness of about 3 μm to about 500 μm. The negative current collector may be any material which does not cause any chemical changes in the lithium battery and has high conductivity without limitation, and examples thereof include copper, a stainless steel, aluminum, nickel, titanium, a heat-treated carbon, a copper or stainless steel surface-treated with carbon, nickel, titanium, and silver, or an aluminum-cadmium alloy. In addition, like the positive current collector, adhesion to the negative active material may be enhanced by forming fine irregularities on the surface of the negative current collector, and the negative current collector may be used in any of various forms including films, sheets, foils, nets, porous structures, foams, and non-woven fabrics.

The separator is interposed between the positive electrode and the negative electrode prepared according to the above-described process. The separator may have a pore diameter of about 0.01 μm to about 10 μm and a thickness of about 5 μm to about 300 μm. Particularly, examples of the separator include: an olefin-based polymer such as a polypropylene and a polyethylene; or a sheet or a non-woven fabric formed of glass fibers. When a solid electrolyte such as a polymer is used as the electrolyte, the solid electrolyte may also serve as a separator.

A lithium salt-containing non-aqueous electrolyte is composed of a non-aqueous electrolyte solution and lithium. As the non-aqueous electrolyte, a non-aqueous electrolyte solution, an organic solid electrolyte, or an inorganic solid electrolyte may be used.

Examples of the non-aqueous electrolyte solution may include any aprotic organic solvent such as N-methyl-2-pyrrolidone, a propylene carbonate, an ethylene carbonate, a butylene carbonate, a dimethyl carbonate, a diethyl carbonate, gamma-butyro lactone, 1,2-dimethoxy ethane, 2-methyl tetrahydrofuran, dimethylsulfoxide, 1,3-dioxolane, N,N-formamide, N,N-dimethylformamide, a dioxolane, an acetonitrile, a nitromethane, a methyl formate, a methyl acetate, a phosphoric acid triester, a trimethoxy methane, dioxolane derivatives, a sulfolane, a methyl sulfolane, 1,3-dimethyl-2-imidazolidinone, propylene carbonate derivatives, tetrahydrofuran derivatives, an ether, a methyl propionate, and an ethyl propionate. Examples of the organic solid electrolyte may include polyethylene derivatives, polyethylene oxide derivatives, polypropylene oxide derivatives, phosphoric acid ester polymers, a polyester sulfide, a polyvinyl alcohol, and a polyvinylidene fluoride.

Examples of the inorganic solid electrolyte may include a nitride, a halide, or a sulfate of Li such as $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, and $Li_3PO_4$—$Li_2S$—$SiS_2$. Any lithium salt readily soluble in the non-aqueous electrolyte and may be used, and non-limiting examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, a lithium chloroborate, a lower aliphatic carboxylic acid lithium, a lithium tetraphenyl borate lithium imide, and the like, without being limited thereto.

Figure 3:
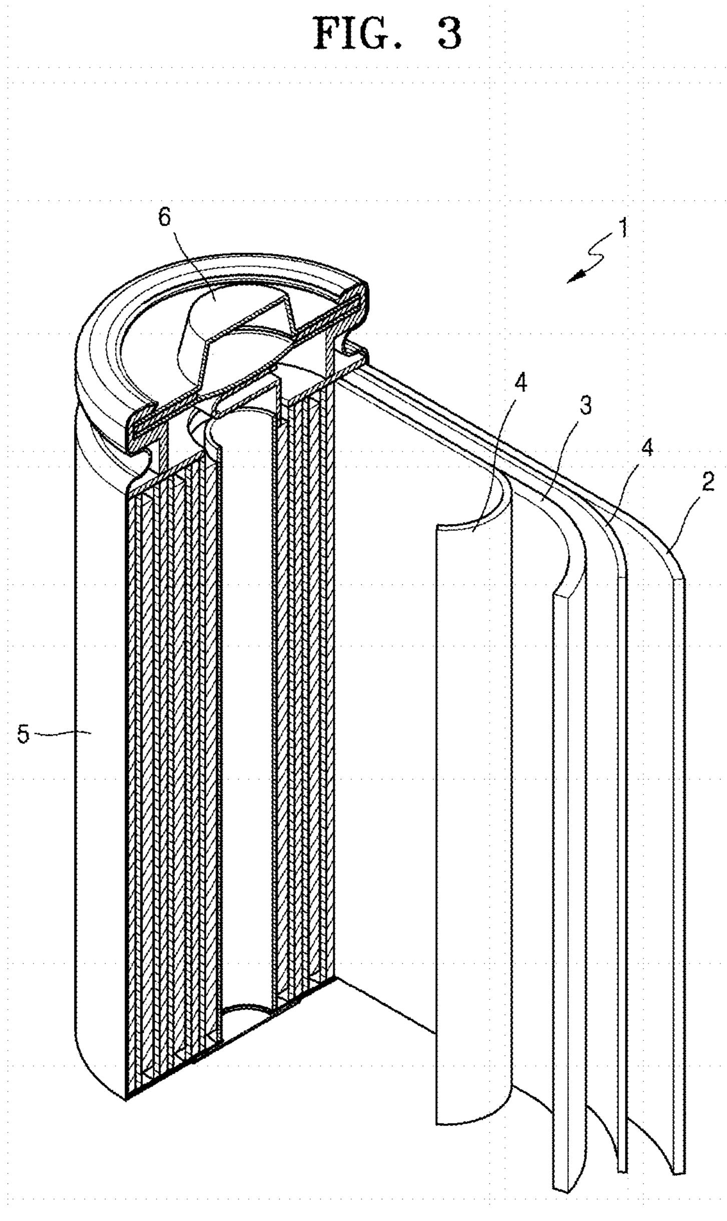
FIG. 3 is a perspective, cut-away schematic diagram of an embodiment of a lithium secondary battery.

FIG. 3 is a perspective, cut-away schematic diagram of an embodiment of a lithium secondary battery.

Referring to FIG. 3, a lithium secondary battery 1 includes a positive electrode 3, a negative electrode 2, and a separator 4. An electrode assembly prepared by winding or folding the positive electrode 3, the negative electrode 2, and the separator 4 described above is accommodated in a battery case 5. According to the shape of the battery, a battery structure in which a separator is interposed between the positive electrode and the negative electrode may be prepared. Subsequently, an organic electrolyte is injected into the battery case 5, and the battery case 5 is sealed with a cap assembly 6, thereby completing the manufacture of the lithium secondary battery 1. The battery case 5 may have a generally cylindrical, a generally rectangular, or a generally thin-film shape. For example, the lithium secondary battery 1 may be a large-sized thin film type battery. The lithium secondary battery may be a lithium ion battery. The battery assembly is accommodated in a pouch, impregnated with an organic electrolyte, and sealed to prepare a lithium ion polymer battery. In addition, a plurality of battery assemblies may be stacked to form a battery pack, which may be used in any device that requires high capacity and high output, e.g., notebook computers, smartphones, and electric vehicles. In addition, due to excellent storage stability, lifespan characteristics, and high-rate characteristics at high temperature, the lithium secondary battery may be applied to electric vehicles (EVs), e.g., plug-in hybrid electric vehicles (PHEVs).

Hereinafter, one or more embodiments will be described in detail with reference to the following examples and comparative examples. However, these examples are not intended to limit the purpose and scope of the one or more embodiments.

EXAMPLES

Preparation of Large Ni-Based Metal Hydroxide and Small Ni-Based Metal Hydroxide

Preparation Example 1: Preparation of Large Ni-Based Metal Hydroxide

A large Ni-based metal hydroxide ($Ni_{0.90}Co_{0.07}Al_{0.03}(OH)_2$) was obtained according to a coprecipitation method described below.

Ammonia water was added to a reactor, and the pH of a mixture of the reactor was adjusted using sodium hydroxide added while stoichiometrically adjusting raw materials of a Ni-based metal hydroxide to obtain the large Ni-based metal hydroxide ($Ni_{0.90}Co_{0.07}Al_{0.03}(OH)_2$). Subsequently, reaction was performed while stirring until a product has a desired size. Then, adding of the raw materials was stopped and the resultant was dried to obtain a target product. This preparation process will be described in more detail.

Nickel sulfate hexahydrate ($NiSO_4·6H_2O$), cobalt sulfate heptahydrate ($CoSO_4·7H_2O$), and aluminum sulfate monohydrate ($Al_2(SO_4)_3·4H_2O$), as raw materials of the Ni-based metal hydroxide, were dissolved in distilled water, as a solvent, in a molar ratio of 90:7:3 to prepare a mixed solution. An ammonia water ($NH_4OH$) dilute solution and sodium hydroxide (NaOH), as a precipitant, were prepared to form a complex compound. Then, the mixed solution of the metal raw materials, ammonia water, and sodium hydroxide were added to the reactor, respectively. Sodium hydroxide was added thereto to maintain the pH in the reactor. Subsequently, after performing reaction for about 20 hours while stirring, adding of the raw materials was stopped. The pH in the reactor was 11.3.

A slurry solution contained in the reactor was filtered and washed with high-purity distilled water, and then dried in a hot-air dryer at 190° C. for 24 hours to obtain large Ni-based metal hydroxide ($Ni_{0.90}Co_{0.07}Al_{0.03}(OH)_2$) powder having a particle size of about 18 μm.

Preparation Example 2: Preparation of Small Ni-Based Metal Hydroxide

A small Ni-based metal hydroxide ($Ni_{0.90}Co_{0.07}Mn_{0.03}(OH)_2$) powder having a particle size of 3 μm was prepared in the same manner as in Preparation Example 1 above, except that manganese sulfate ($MnSO_4·6H_2O$) was used instead of aluminium sulfate ($Al_2(SO_4)_3·H_2O$), and the amounts of nickel sulfate hexahydrate ($NiSO_4 \cdot 6H_2O$), cobalt sulfate ($CoSO_4 \cdot 7H_2O$), and manganese sulfate ($MnSO_4 \cdot H_2O$) were stoichiometrically adjusted and the precursor was dried in a hot-air oven at 210° C. for 24 hours instead of at 190° C. for 24 hours to obtain the small Ni-based metal hydroxide ($Ni_{0.90}Co_{0.07}Mn_{0.03}(OH)_2$).

Preparation of Ni-Based Lithium Metal Composite Oxide, Positive Electrode and Lithium Secondary Battery Including the Same Example 1

The large Ni-based metal hydroxide having a size of 18 μm obtained according to Preparation Example 1 was mixed with the small Ni-based metal hydroxide having a size of 3 μm obtained according to Preparation Example 2 in a weight ratio of 80:20 to obtain a Ni-based metal hydroxide mixture.

The Ni-based metal hydroxide mixture and anhydrous lithium hydroxide (LiOH) were dry-mixed using a mixer sold under the trade designation HENSCHEL by Zeppelin Systems GmbH of Friedrichshafen, Germany, and heat-treated in an oxygen atmosphere at about 720° C. for 10 hours to obtain a Ni-based lithium metal composite oxide including large secondary particles and small secondary particles. In this regard, when the Ni-based metal hydroxide mixture was mixed with the anhydrous lithium hydroxide, a molar ratio of lithium to transition metal was 1:1.05, wherein the transition metal refers to a total amount of metals excluding lithium contained in the Ni-based metal hydroxide.

The large secondary particles had an average particle diameter of 18 μm, the small secondary particles had an average particle diameter of 3 μm, a mixing weight ratio of the large secondary particles to the small secondary particles was 80:20, and a difference of the Mn content between the large secondary particles and the small secondary particles was 3 mol %.

$LiNi_{0.90}Co_{0.07}Al_{0.03}$ (NCA) (Particle A) having an average particle diameter of 18 μm, as the large secondary particles, was mixed with $LiNi_{0.90}Co_{0.07}Mn_{0.03}O_2$ (NCM) (Particle B) having an average particle diameter of 3 μm, as small secondary particles, to prepare a positive active material. A mixing weight ratio of Particle A to Particle B was 80:20.

The positive active material, a carbonaceous conductive material sold under the trade designation SUPER P by Imerys Graphite & Carbon Switzerland SA of Bodio, Switzerland, and a polyvinylidene fluoride (PVDF) binder were mixed to prepare a positive active material slurry. In the positive active material slurry, a mixing weight ratio of the active material:conductive material:binder was 96:2:2. The slurry was coated on an aluminum current collector having a thickness of 12 μm using a thick film coater to a loading level of 36 mg/cm$^2$, dried at 120° C. for 1 hour or more, and rolled to prepare a positive electrode.

A graphite powder sold under the trade designation JAPAN CARBON by Nippon Carbon Co., Ltd., of Tokyo, Japan, as a negative active material, was mixed with a mixture prepared by mixing a styrene butadiene rubber (SBR) and a carboxymethyl cellulose (CMC) in a mixing weight ratio of 1:1 to prepare a negative active material slurry. In the negative active material slurry, a mixing weight ratio of graphite powder to the mixture of SBR and CMC was 98:2.

The prepared negative active material slurry was coated on a copper (Cu) foil current collector having a thickness of 8 μm to a loading level of 19.5 mg/cm$^2$. The coated electrode plate was dried at 100° C. for 1 hour or more and rolled to prepare a negative electrode having a mixture density of 1.66 g/cm$^2$.

A lithium secondary battery having a capacity of 2000 milli-ampere-hours (mAh) was prepared using the positive electrode and the negative electrode, a polyethylene separator sold under the trade designation STAR 20 by Asahi Kasei Corp. of Tokyo, Japan, and an electrolyte prepared by dissolving 1.15M $LiPF_6$ in a mixed solvent of ethylene carbonate (EC):ethylmethyl carbonate (EMC):dimethyl carbonate (DMC) (in a volume ratio of 3:3:4).

Example 2

A Ni-based lithium metal composite oxide, and a positive electrode and a lithium secondary battery both including the Ni-based lithium metal composite oxide were prepared in the same manner as in Example 1, except that the heat treatment temperature was 700° C. instead of 720° C. in the preparation of the Ni-based lithium metal composite oxide including the large secondary particles and the small secondary particles.

Example 3

A Ni-based lithium metal composite oxide, and a positive electrode and a lithium secondary battery both including the Ni-based lithium metal composite oxide were prepared in the same manner as in Example 1, except that the heat treatment temperature was 740° C. instead of 720° C. in the preparation of the Ni-based lithium metal composite oxide including the large secondary particles and the small secondary particles.

Example 4

A Ni-based lithium metal composite oxide, and a positive electrode and a lithium secondary battery both including the Ni-based lithium metal composite oxide were prepared in the same manner as in Example 1, except that the mixing weight ratio of Particle A to Particle B was 70:30 instead of 80:20 in the preparation of the positive active material.

Example 5

A Ni-based lithium metal composite oxide, and a positive electrode and a lithium secondary battery both including the Ni-based lithium metal composite oxide were prepared in the same manner as in Example 1, except that the heat treatment temperature was 740° C. instead of 720° C. in the preparation of the Ni-based lithium metal composite oxide including the large secondary particles and the small secondary particles and the mixing weight ratio of Particle A to Particle B was 70:30 instead of 80:20 in the preparation of the positive active material.

Examples 6 to 9

Ni-based lithium metal composite oxides, and positive electrodes and lithium secondary battery both including the Ni-based lithium metal composite oxides were prepared in the same manner as in Example 1, except that the average particle diameters of the large secondary particles and the small secondary particles were changed as shown in Table 1 below.

TABLE 1

| Examples | Average particle diameter of large secondary particles (μm) | Average particle diameter of small secondary particles (μm) |
|---|---|---|
| Example 6 | 16 | 3 |
| Example 7 | 14 | 3 |
| Example 8 | 18 | 4 |
| Example 9 | 18 | 2 |

Comparative Example 1

The large Ni-based metal hydroxide having an average particle diameter of 18 μm obtained in Preparation Example 1 was subjected to first heat treatment in an oxygen atmosphere at about 720° C. for 10 hours to prepare a Ni-based lithium metal composite oxide (NCA), as large secondary particles.

Separately, the small Ni-based metal hydroxide having an average particle diameter of 3 μm obtained in Preparation Example 2 was subjected to second heat treatment in an oxygen atmosphere at about 740° C. for 10 hours to prepare a Ni-based lithium metal composite oxide (NCM), as small secondary particles.

The NCA and the NCM were dry-mixed in a mixing weight ratio of 80:20 using a HENSCHEL mixer and subjected to third heat treatment in an oxygen atmosphere at about 700° C. for 10 hours to obtain a Ni-based lithium metal composite oxide including large secondary particles and small secondary particles. The large secondary particles had an average particle diameter of 18 μm, the small secondary particles had an average particle diameter of 3 μm, a mixing weight ratio of the large secondary particles to the small secondary particles was 80:20, and a difference of the Mn content between the large secondary particles and the small secondary particles was 3 mol %.

A lithium secondary battery was prepared in the same manner as in Example 1, except that the Ni-based lithium metal composite oxide of Comparative Example 1 was used instead of the Ni-based lithium metal composite oxide of Example 1.

Comparative Example 2

A lithium secondary battery was prepared in the same manner as in Example 1, except that $LiNi_{0.85}Co_{0.14}Mn_{0.01}O_2$ (NCM), as large secondary particles, were used instead of $LiNi_{0.90}Co_{0.07}Al_{0.03}$ (NCA) having an average particle diameter of 18 μm, as the large secondary particles, and $LiNi_{0.9}Co_{0.09}Al_{0.01}O_2$ (NCA), as small secondary particles were used instead of $LiNi_{0.90}Co_{0.07}Mn_{0.03}O_2$ (NCM) (Particle B) having an average particle diameter of 3 μm, as small secondary particles.

Evaluation Example 1: TOF-SIMS

The Ni-based lithium metal composite oxides of Example 1 and Comparative Example 1 were evaluated by TOF-SIMS (Time-of-Flight Secondary Ion Mass Spectrometry, Germany ION-TOF Co., Product Name: ION-TOF IV). In the TOF-SIMS analysis, TOF.SIMS-5 manufactured by ION-TOF was used.

FIGS. 1A to 1E are photographic depictions illustrating results of time-of-flight secondary ion mass spectrometry (TOF-SIMS) analysis of a Ni-based lithium metal composite oxide of Example 1. FIGS. 2A to 2E are photographic depictions illustrating results of TOF-SIMS analysis of a Ni-based lithium metal composite oxide of Comparative Example 1.

Evaluation results are shown in FIGS. 1A to 1E and FIGS. 2A to 2E. FIGS. 1A to 1E show results of TOF-SIMS analysis of the Ni-based lithium metal composite oxide of Example 1 and FIGS. 1B to 1E show mapping results of lithium, nickel, manganese, and aluminum, respectively. FIGS. 2A to 2E show results of TOF-SIMS analysis of the Ni-based lithium metal composite oxide of Comparative Example 1 and FIGS. 2B to 2E show mapping results of lithium, nickel, manganese, and aluminum, respectively.

Figure 1D:
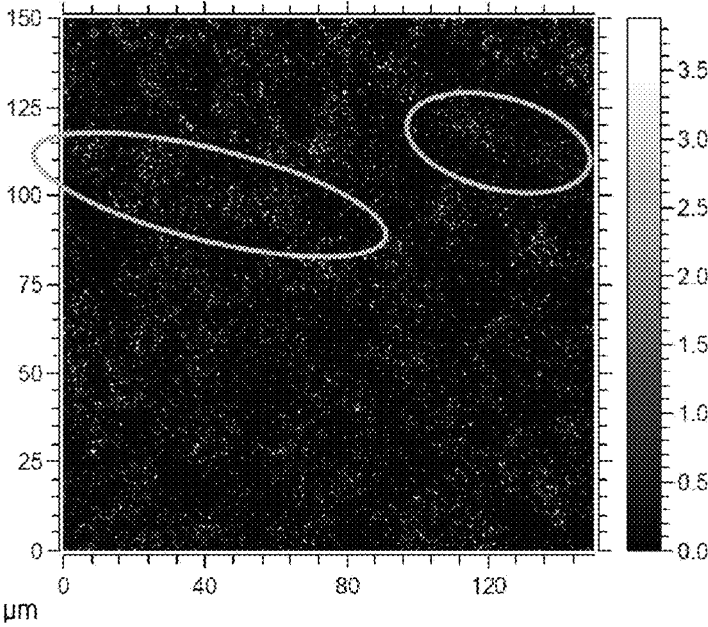
Figure 1E:
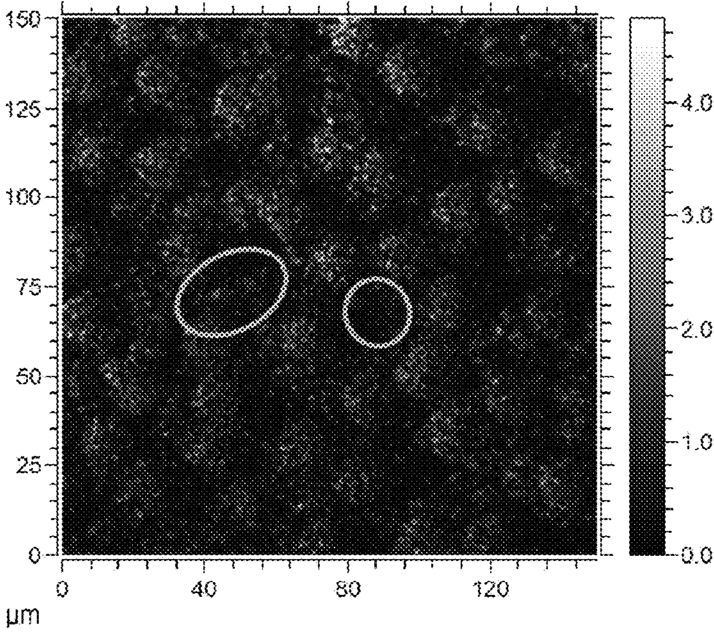
Figure 2A:
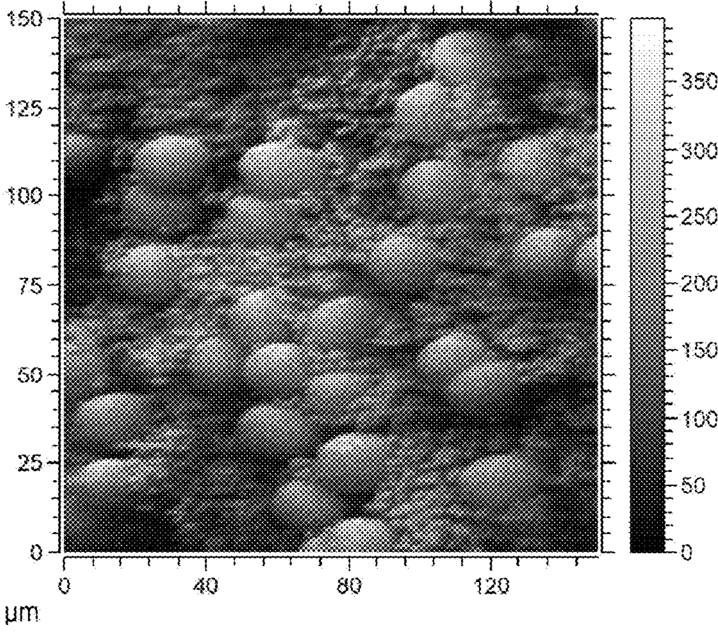
FIGS. 2A to 2E are photographic depictions illustrating results of TOF-SIMS analysis of a Ni-based lithium metal composite oxide of Comparative Example 1.
Figure 2B:
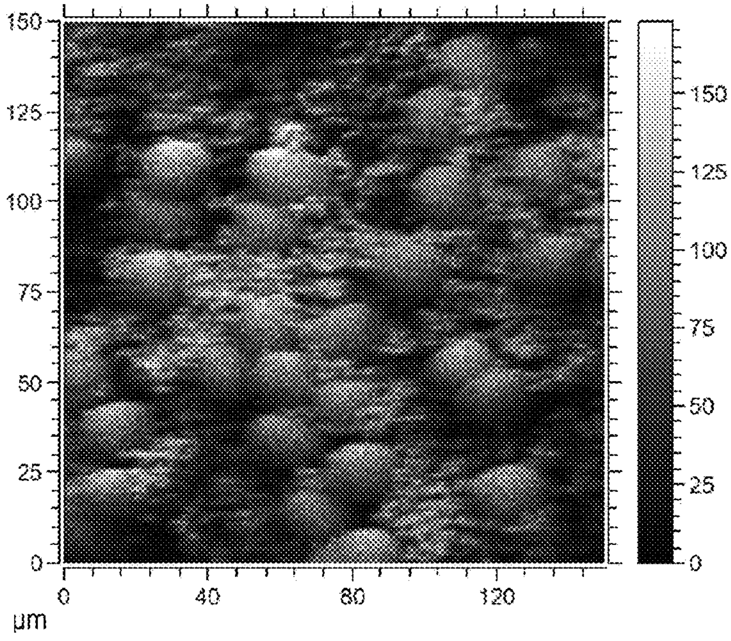
Figure 2C:
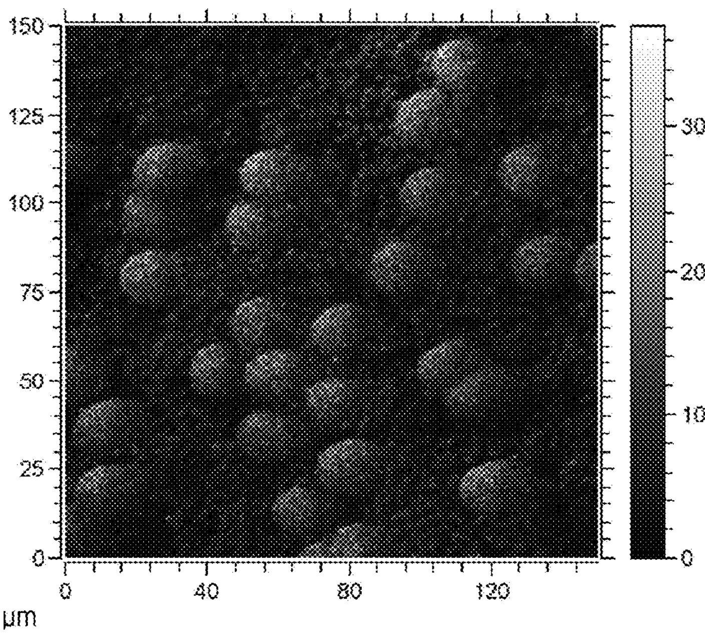
Figure 2D:
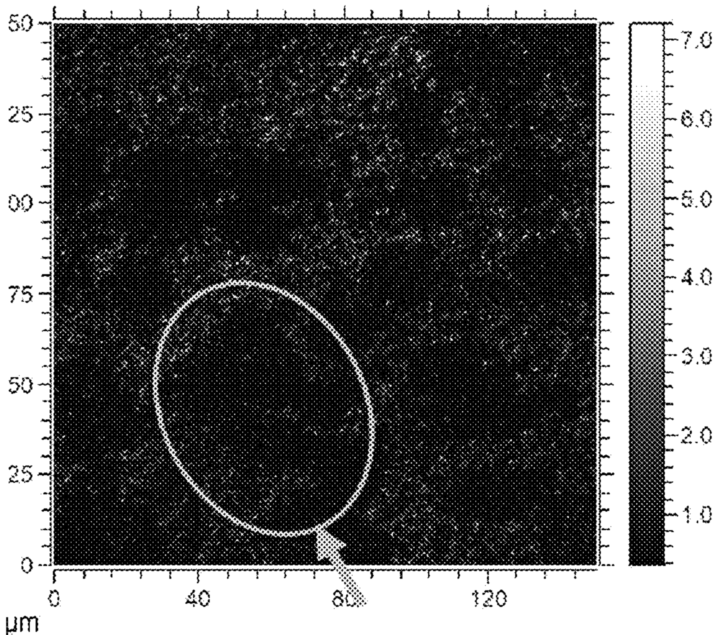
Figure 2E:
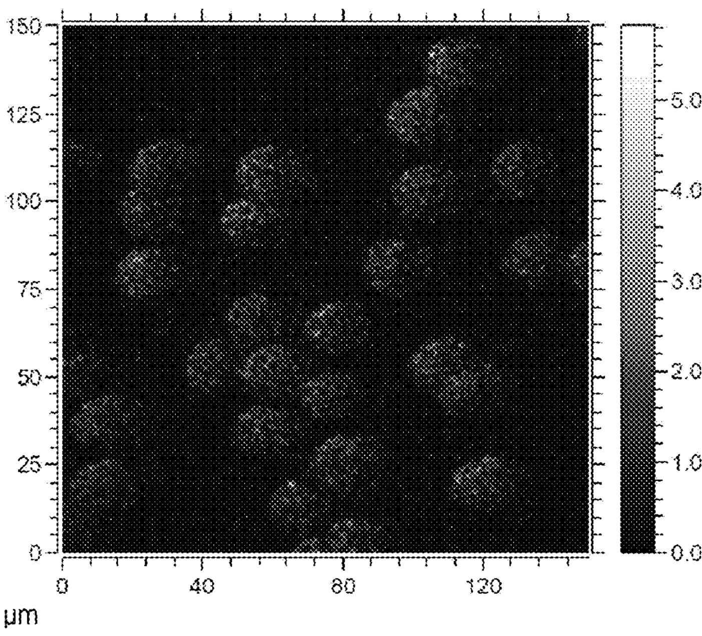

In the Ni-based lithium metal composite oxide of Comparative Example 1, Mn was not detected in positions of the large secondary particles (marked with a circle) as shown in FIG. 2D and Al was not detected in positions of the small secondary particles as shown in FIG. 2E. However, in the Ni-based lithium metal composite oxide of Example 1, Mn was detected in positions of the large secondary particles (marked with a circle) as shown in FIG. 1D and Al was detected in positions of the small secondary particles (marked with a circle) as shown in FIG. 1E.

Evaluation Example 2: Efficiency and Lifespan Characteristics

Charge/discharge characteristics of lithium secondary batteries prepared according to Examples 1 to 5 and Comparative Example 1 were evaluated using a charger/discharger sold under the trade designation TOYO-3100 by Toyo Corporation of Tokyo, Japan.

Lifespan characteristics were evaluated by charging each cell at a constant current of 1 coulomb (C) until the voltage reached 4.3 volt (V) and then at a constant voltage until the current reached 0.05 C. After charging was completed, each cell was rested for about 10 minutes and discharge at a constant current of 1 C until the voltage reached 3 V. This cycle was repeated 50 times.

Capacity retention ratio (CRR) is calculated from Equation 2 below, charge/discharge efficiency is calculated from Equation 3, and capacity retention ratio and charge/discharge efficiency of some batteries are shown in Table 2 below.

Capacity retention ratio [percent (%)]=[discharge capacity at $50^{th}$ cycle/discharge capacity at $1^{st}$ cycle]×100 Equation 2

Charge/discharge efficiency [%]=[discharge voltage at 1st cycle/charge voltage at 1st cycle)]×100 Equation 3

TABLE 2

| Example | Heat-treating temperature (° C.) | Large-grain:small-grain mixing weight ratio | Charge/discharge efficiency (%) | Capacity retention ratio (@ 50 times)(%) |
|---|---|---|---|---|
| Example 1 | 720 | 80:20 | 88 | 95 |
| Example 2 | 700 | 80:20 | 87 | 95 |
| Example 3 | 740 | 80:20 | 88 | 94 |
| Example 4 | 720 | 70:30 | 89 | 95 |
| Example 5 | 740 | 70:30 | 89 | 95 |
| Comparative Example 1 | — | 80:20 | 86 | 92 |

Referring to Table 2, the lithium secondary batteries prepared according to Examples 1 to 5 had excellent charge capacity and high efficiency. The lithium secondary battery according to Comparative Example 1 has excellent charge/discharge efficiency and capacity retention ratio as shown in Table 2. However, because the Ni-based lithium metal composite oxide, which is obtained by three calcination processes including separately calcining the large and small secondary particles, is used as the positive electrode, manufacturing costs and time increase, and thus it is difficult to actually apply this method.

The Ni-based lithium metal composite oxide of some embodiments may be prepared by simultaneously heat-treating the large secondary particles and the small secondary particles. As a result, the number of heat treatment may be reduced, thereby lowering manufacturing costs. When the positive electrode including the Ni-based lithium metal composite oxide is used, capacity, lifespan, and storage characteristics at high temperature may be improved.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A nickel-based lithium metal composite oxide comprising secondary particles including aggregates of primary particles, wherein:

the secondary particles comprise i) large secondary particles having a particle size of at least 14 μm and including aluminum and ii) small secondary particles having a particle size of no more than 5 μm and including manganese;

each of the large secondary particles comprises a core and a surface layer around the core, and each of the small secondary particles comprises a core and a surface layer around the core;

a manganese content by mole percent of the large secondary particles based on total moles of metal excluding lithium of the large secondary particles is smaller than a manganese content by mole percent of the small secondary particles based on total moles of metal excluding lithium of the small secondary particles; and the surface layer of at least some of the large secondary particles comprises aluminum and from 0.01 mol % to 0.2 mol % manganese based on a total amount of transition metals of the large secondary particles, the manganese on the surface layer of the large secondary particles is a kind of manganese from a precursor of the small secondary particles, and the surface layer of at least some of the small secondary particles comprises manganese and from 0.01 mol % to 0.2 mol % aluminum based on a total amount of transition metals of the small secondary particles, wherein the core of each of the small secondary particles consists of a compound represented by Formula 2:

$$Li_a(Ni_{1-x-y-z}Co_xMn_yM_z)O_{2\pm\alpha1}, \text{ and} \quad \text{Formula 2}$$

wherein in Formula 2, M is boron, magnesium, calcium, strontium, barium, titanium, vanadium, chromium, iron, copper, or zirconium, $0.95 \le a \le 1.1$, $0.6 \le (1-x-y-z) < 1$, $0 < x < 0.4$, $0 < y < 0.4$, $0 \le z < 0.4$, and $0 \le \alpha 1 \le 0.1$.

2. The nickel-based lithium metal composite oxide of claim 1, wherein the core of each of the large secondary particles excludes manganese or the core of at least some of the large secondary particles comprises from 0.01 mol % to 0.5 mol % manganese based on total moles of metal excluding lithium of the large secondary particles.

3. The nickel-based lithium metal composite oxide of claim 1, wherein the cores of at least some of the small secondary particles each comprise from 0.5 mol % to 5 mol % manganese based on total moles of metal excluding lithium of the small secondary particles.

4. The nickel-based lithium metal composite oxide of claim 1, wherein some of the large secondary particles have a particle size of 14 μm to 20 μm.

5. The nickel-based lithium metal composite oxide of claim 1, wherein some of the small secondary particles have a particle size of 1 μm to 5 μm.

6. The nickel-based lithium metal composite oxide of claim 1, wherein the nickel-based lithium metal composite oxide comprises at least 60 mol % nickel based on total moles of metal excluding lithium of the nickel-based lithium metal composite oxide.

7. The nickel-based lithium metal composite oxide of claim 1, wherein an amount of the large secondary particles is from 30 parts by weight to 90 parts by weight based on 100 parts by weight of a total amount of the large secondary particles and the small secondary particles.

8. The nickel-based lithium metal composite oxide of claim 1, wherein the core of each of the large secondary particles consists of a compound of Formula 1 below:

$$Li_a(Ni_{1-x-y-z}Co_xAl_yM_z)O_{2\pm\alpha1} \quad \text{Formula 1}$$

wherein in Formula 1, M is boron, magnesium, calcium, strontium, barium, titanium, vanadium, chromium, iron, copper, or zirconium, $0.95 \le a \le 1.1$, $0.6 \le (1-x-y-z) < 1$, $0 < x < 0.4$, $0 < y < 0.4$, $0 \le z < 0.4$, and $0 \le \alpha 1 \le 0.1$.

9. The nickel-based lithium metal composite oxide of claim 1, wherein in Formula 2, $0.001 < y < 0.3$.

10. The nickel-based lithium metal composite oxide of claim 1, wherein at least some of the large secondary particles comprise from 0.5 mol % to 5 mol % aluminum based on total moles of metal excluding lithium of the large secondary particles.

11. A method of preparing the nickel-based lithium metal composite oxide according to claim 1, the method comprising the steps of:

preparing a precursor mixture by mixing a large precursor having a size of at least 14 μm and including aluminum, a small precursor having a size of no more than 5 μm and including manganese, and a lithium precursor; and heat-treating the precursor mixture, wherein the heat-treating is performed at a temperature of 600° C. to 900° C. to simultaneously treat the large precursor and the small precursor to obtain the secondary particles of the nickel-based lithium metal composite oxide, wherein the large precursor comprises from 0.5 mol % to 5 mol % aluminum based on total moles of metal of the large precursor, and wherein the small precursor does not comprise aluminum.

12. The method of claim 11, wherein:

the large precursor excludes manganese or the large precursor comprises from 0.01 mol % to 0.5 mol % manganese based on total moles of metal of the large precursor; and the small precursor comprises from 0.5 mol % to 5 mol % manganese based on total moles of metal of the small precursor.

13. The method of claim 11, wherein the lithium precursor comprises an anhydrous lithium hydroxide, a lithium hydroxide hydrate, a lithium fluoride, a lithium carbonate, or any mixture thereof.

14. A positive electrode comprising the nickel-based lithium metal composite oxide of claim 1.

15. A lithium secondary battery comprising the positive electrode of claim 14, a negative electrode, and an electrolyte therebetween.

16. A metal oxide composite comprising nickel, lithium, and secondary particles including aggregates of primary particles, wherein:

the secondary particles comprise i) large secondary particles having a particle size of at least 14 μm and including aluminum and ii) small secondary particles having a particle size of no more than 5 μm and including manganese;

each of the large secondary particles comprises a core and a surface layer around the core;

each of the small secondary particles comprises a core and a surface layer around the core;

a manganese content by mole percent of at least some of the large secondary particles is smaller than a manganese content by mole percent of at least some of the small secondary particles;

the surface layer of at least some of the large secondary particles comprises aluminum and from 0.01 mol % to 0.2 mol % manganese based on a total amount of transition metals of the large secondary particles;

the manganese on the surface layer of the large secondary particles is a kind of manganese from a precursor of the small secondary particles; and the surface layer of at least some of the small secondary particles comprises manganese and from 0.01 mol % to 0.2 mol % aluminum based on a total amount of transition metals of the small secondary particles, wherein the core of each of the small secondary particles consists of a compound represented by Formula 2:

$$Li_a(Ni_{1-x-y-z}Co_xMn_yM_z)O_{2\pm\alpha 1}, \text{ and} \qquad \text{Formula 2}$$

wherein in Formula 2, M is boron, magnesium, calcium, strontium, barium, titanium, vanadium, chromium, iron, copper, or zirconium, $0.95 \leq a \leq 1.1$, $0.6 \leq (1-x-y-z) < 1$, $0 < x < 0.4$, $0 < y < 0.4$, $0 \leq z < 0.4$, and $0 \leq \alpha 1 \leq 0.1$.

* * * * *